United States Patent Office 3,651,053
Patented Mar. 21, 1972

3,651,053
1,3-THIAZINES
Gerhard Sagner, Wuppertal-Vohwinkel, and Otto Behner, Wuppertal-Elberfeld, Germany, assignors to Farbenfabriken Bayer Aktiengesellschaft, Leverkusen, Germany
No Drawing. Filed Apr. 2, 1969, Ser. No. 812,904
Claims priority, application Germany, Apr. 27, 1968,
P 17 67 335.7
Int. Cl. C07d 93/06
U.S. Cl. 260—243 R
4 Claims

ABSTRACT OF THE DISCLOSURE

Thiazines of the formula:

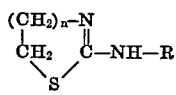

wherein
R is substituted phenyl and
n stands for 1 or 2.

or a physiologically acceptable salt thereof, have been found to be useful for their analgesic, sedative and muscle relaxant properties in animals and have also exhibited utility as anaesthetics for animals.

The risks involved in a general narcosis of cattle must be called substantial (M. Westhues and R. Fritsch, Die Narkose der Tiere, vol. II, page 286; Verlag Paul Parey, Berlin and Hamburg, 1961). Grave disturbances of breathing and tympanies of the rumen occur very easily. A prolonged full narcosis applied to small ruminants involves the same risks as are incured with cattle (M. Westhues and R. Fritsch, l.c. page 289). The application of full narcoses even to domestic cattle is impaired by the physiological properties of the ruminant. [A. Kuntze, Klinische Beiträge zur Anästhesie und medikamentellen Immobilisation der Zootiere (Ursiden, Feliden, Ruminantier), page 105; Verlag Paul Parey, Berlin and Hamburg, 1967.]

The strong analgetics of the morphine series and the synthetic substitutes such as e.g. DL-2-dimethylamino-4,4-diphenylheptan-5-one and N-methyl-4-phenyl-4-carbethoxypiperidine, admittedly, have achieved a certain importance in veterinary medicine as pain-relieving and sedative agents but in the case of ruminants, in particular, the dosage range within which a sedative effect can be achieved is very narrow and is different for the individual animals. If, for example, morphine is administered as a sedative to horses and dogs, the sedation is preceded by more or less strong symptoms of restlessness, while in the case of cats, cattle and small ruminants morphine cannot be used at all because the symptoms of restlessness virtually assume the form of raving. In the case of ruminants, the picture of excitement is predominant, which can also be observed when higher doses are administered to other animal species on which therapeutical doses of analgetics have a sedative effect. For this reason, morphine and its substitutes have achieved no practical clinical importance for ruminants (R. Völker, Untersuchungen über stark wirkende Analgetika, XV. Intern. Veterinary Congress Stockholm 1954, Proc. I, vol. 2, page 1012; K. Steinmetzer, Pharmakologie für Tierärzte, Verlag Urban and Schwarzenberg, Wien and Innsbruck, 1951, page 67; M. Westhues and R. Fritsch, l.c., page 112).

The use of these known agents is therefore problematic even for healthy ruminants; the therapeutical application to diseased animals is thus ruled out altogether. Consequently, the only means hitherto available have been local, conductive or lumbar anaesthesia where it is necessary additionally to administer neuroleptics of the phenothiazine type or chloral hydrate for immobilisation.

Surprisingly, highly effective anaesthetics for animals which do not have the disadvantages of the known compounds as described above have now been found in the class of compounds of the general formula

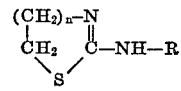

in which

R stands for a substituted phenyl radical and
n is 1 or 2.

In ruminants, especially cattle, the compounds used according to the invention lead to an excellent analgesia and to strong sedation and relaxation of the muscles without the animal passing through a stage of excitement as the effect develops or subsides. If the dosage is suitably high, the compounds achieve, without the addition of neuroleptics, an anaesthesia which enables extremely painful operations, even of a lengthy duration, to be carried out without any risk to the animal or the surgeon and without having to apply coercive measures.

A surprising and completely unexpected feature is the remarkably low dose which is required especially for ruminants and which is only about 1/20 of the amount necessary for animals with single-cavity stomach (e.g. dogs, cats, horses etc.). This is combined with a very broad therapeutical spectrum which enables the usual dosis safely to be exceeded 100 times in special cases.

The high effectiveness of the compound in combination with good local tolerance (solutions with a concentration of the active ingredient of up to 30% by weight and above exhibited a satisfactory to good local tolerance) offer further advantages. The volumes of injection are very small even for large and heavy animals. This is decisive, inter alia, for application by means of a narcosis gum and its small cartridges.

As already explained above (Völker, see above), similar small amounts of morphine and other strong analgetics usually lead to transitory moderate, high doses always lead to serious states of excitement and spasms in all animals. The sedative dosing range of known analgetics is comparatively narrow. Surprisingly, it has now been found, not only with ruminants but with all investigated animal species (all laboratory animals, cats, dogs, pigs, horses and numerous wild animals in zoological gardens, such as e.g. dromedaries, llamas, fallow-deer, wisent (bisons), moufflons, zebus, ibes, lions, tigers, black panthers, leopards, Kodiak bears and wolves), that no states of excitement occur after small and medium as well as high doses of the compounds of the above general formula.

Those compounds of the above general formula are preferred in which the radical R is a phenyl radical which is monosubstituted in the 2-position or disubstituted in the 2- and 4- or 5- or 6-positions, especially in the 2- and 6-positions. Suitable substituents are identical or different, straight-chain or branched alkyl groups with, preferably, 1 to 3 carbon atoms, alkoxy groups and S-alkyl groups with 1 or 2 carbon atoms as well as halogen atoms (preferably fluorine, chlorine, bromine).

Compounds in which the radical R is the 2,6-dimethylphenyl radical have proved particularly effective.

The anaesthetics according to the invention are especially suitable for application to ruminants. In general, it has proved advantageous to administer to domestic cattle, for example, doses of about 0.1 mg. to about 0.5 mg., preferably about 0.2 mg. to about 0.3 mg., per kilogram body weight, in order to achieve effective results. Nevertheless it may sometimes be necessary to deviate from the aforesaid amounts, dependent upon the body weight of the animal or the method of application and the individual reaction of the animal to the medicament.

The compounds can be applied as such or in the form of their salts with physiologically compatible acids such as e.g. hydrochloric acid, hydrobromic acid, sulphuric acid, phosphoric acid, acetic acid, lactic acid, fumaric acid, maleic acid, succinic acid, citric acid, methane-sulphonic acid, naphthalene-1,5-disulphonic acid, by themselves or in combination with pharmaceutically acceptable carriers. Suitable forms for administration in combination with various inert carriers are tablets, capsules, sprays, suspensions, emulsions, solutions, elixirs or syrups. Such carriers comprise solid extenders or fillers, water and various nontoxic organic solvents or liquid diluents and the like. If desired, the solutions, emulsions, elixirs or syrups intended for parenteral application can be sterilised according to known methods.

Suitable organic solvents or liquid diluents are, for example, sesame oil, olive oil or ground nut oil, 1,2-propanediol, 1,3-butane-diol, glycerol, dimethyl sulphoxide, N-methyl-acetamide, or N,N-dimethyl-acetamide, used by themselves or as mixtures with one another or with water.

Aqueous solutions should be buffered in the usual way, and the liquid solvent or diluent should be rendered isotonic by the addition of the necessary amount of sodium chloride or glucose. Such solutions are particularly suitable for intravenous, intramuscular, subcutaneous and intraperitoneal injections.

Of particular interest is the use of the following compounds (Nos. 1–17) the preparation of which is described either (a) By M. Tišler in Arch. Pharm. 293, 621 (1960) or
(b) In German patent specification No. 1,173,475 or
(c) By H. Najer and R. Giudicelli, in Bull. soc. chim. France 1960, 960–963.

The new compounds are likewise obtainable according to these processes.

In an analogous manner there is obtained 2-(2-fluorophenylamino)-5,6-dihydro-4H-1,3-thiazine (yield 76% of theory).

EXAMPLE II 21.4 g. (0.1 mol) 2-bromophenyl-isothiocyanate are added dropwise within 15 minutes to a well stirred emulsion of 7.5 g. (0.1 mol) 3-aminopropanol-(1) in 50 cc. of ether. The ether begins to boil. The mixture is stirred under reflux for 30 minutes and the ether is then distilled off. The residue is mixed with 100 cc. of concentrated aqueous hydrochloric acid and boiled under reflux for 30 minutes. After cooling, the mixture is diluted with water, filtered off from impurities, and the base is precipitated by the addition of a concentrated aqueous sodium hydroxide solution. After recrystallisation from benzene-ligroin, the 2-(2-bromophenylamino)-5,6-dihydro-4H-1,3-thiazine melts at 124–126° C.; yield 18.5 g. (68% of theory).

We claim:
1. A compound of the formula:

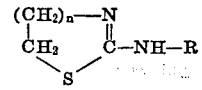

wherein
R is 2-chlorophenyl, 2-bromophenyl or 2-fluorophenyl and
n is 2,
or a physiologically acceptable acid addition salt thereof.

2. The compound according to claim 1 which is 2-(2-fluorophenylamino)-5,6-dihydro-4H-1,3-thiazine.
3. The compound according to claim 1 which is 2-(2-chlorophenylamino)-5,6-dihydro-4H-1,3-thiazine.
4. The compound according to claim 1 which is 2-(2-bromophenylamino)-5,6-dihydro-4H-1,3-thiazine.

| No. | Compound | M.P., °C. | Process |
|---|---|---|---|
| 1 | 2-(2-methylphenylamino)-5,6-dihydro-4H-1,3-thiazine | 121 | (a) |
| 2 | 2-(2-fluorophenylamino)-5,6-dihydro-4H-1,3-thiazine | 122.5–124 | |
| 3 | 2-(2-chlorophenylamino)-5,6-dihydro-4H-1,3-thiazine | 124–127 | |
| 4 | 2-(2-bromophenylamino)-5,6-dihydro-4H-1,3-thiazine | 124–126 | |
| 5 | 2-(2-methoxyphenylamino)-5,6-dihydro-4H-1,3-thiazine | 127 | (a) |
| 6 | 2-(2,6-dimethylphenylamino)-5,6-dihydro-4H-1,3-thiazine | 136–139 | (b) |
| 7 | 2-(2-methyl-5-chlorophenylamino)-5,6-dihydro-4H-1,3-thiazine | 164–165 | (b) |
| 8 | 2-(2,6-diethylphenylamino)-5,6-dihydro-4H-1,3-thiazine | 111–115 | (b) |
| 9 | 2-(2-chloro-6-methylphenylamino)-5,6-dihydro-4H-1,3-thiazine hydrochloride | 182–183 | (b) |
| 10 | 2-(2,6-dichlorophenylamino)-5,6-dihydro-4H-1,3-thiazine hydrochloride | 236–239 | (b) |
| 11 | 2-(2-ethyl-6-methylphenylamino)-5,6-dihydro-4H-1,3-thiazine | 85–88 | (b) |
| 12 | 2-(2,4-dimethylphenylamino)-5,6-dihydro-4H-1,3-thiazine | 96–99 | (b) |
| 13 | 2-(2-isopropyl-6-methylphenylamino)-5,6-dihydro-4H-1,3-thiazine | 108–109.5 | (b) |
| 14 | 2-(2,6-dimethoxyphenylamino)-5,6-dihydro-4H-1,3-thiazine | 135–136.5 | (b) |
| 15 | 2-(2,6-diisopropylphenylamino)-5,6-dihydro-4H-1,3-thiazine | 151–154 | (b) |
| 16 | 2-(2-methoxy-6-methylphenylamino)-5,6-dihydro-4H-1,3-thiazine | 120.5–122 | (b) |
| 17 | 2-(2,6-dimethylphenylamino)-Δ²-thiazoline | 102 | (c) |

The preparation of the new compounds Nos. 2, 3 and 4 is explained in the following examples.

EXAMPLE I

A solution of 16.3 g. (0.12 mol) 3-chloropropyl-(1)-isothiocyanate in 20 cc. of absolute toluene is slowly added dropwise to an ice-cold solution of 15.3 g. (0.12 mol) 2-chloroaniline in 50 cc. of absolute toluene, the mixture is subsequently stirred at room temperature for 2 hours and under reflux for one hour. After cooling, the product is extracted with water, the base is precipitated from the aqueous solution by the addition of a concentrated aqueous sodium hydroxide solution and recrystallised from benzene-ligroin. 19.3 g. (71% of theory) of 2-(2-chlorophenylamino)-5,6-dihydro-4H-1,3-thiazine are obtained; M.P. 124–127° C.

References Cited

UNITED STATES PATENTS 3,227,713  1/1966  Behner et al. _____ 260—243

FOREIGN PATENTS 1,173,475  1/1965  Germany _____ 260—243

OTHER REFERENCES

Tisler, Archiv der Pharmizie, vol. 293, pp. 621–6 (1960).

JOHN M. FORD, Primary Examiner

U.S. Cl. X.R.

260—306.7; 424—246, 270